United States Patent [19]
Wolff

[11] Patent Number: 5,353,579
[45] Date of Patent: Oct. 11, 1994

[54] MOWER WITH DYNAMIC LOAD-LIGHTENING

[75] Inventor: Michel Wolff, Waltenheim sur Zorn, France

[73] Assignee: Kuhn, S.A., Saverne Cedex, France

[21] Appl. No.: 5,845

[22] Filed: Jan. 19, 1993

[30] Foreign Application Priority Data

Jan. 17, 1992 [FR] France ............... 92 00624

[51] Int. Cl.⁵ .......................................... A01D 34/66
[52] U.S. Cl. .................................. 56/15.2; 56/6; 56/DIG. 14
[58] Field of Search ............... 56/14.9, 6, 15.1, 15.2, 56/15.7, 15.8, 255, 295, DIG. 14

[56] References Cited

U.S. PATENT DOCUMENTS

| | | | |
|---|---|---|---|
| 4,693,062 | 9/1987 | van der Lely | 56/13.6 |
| 4,896,493 | 1/1990 | Neuerburg | 56/255 |
| 4,974,399 | 12/1990 | Haberkorn | 56/6 |
| 5,101,616 | 4/1992 | Wolff | 56/15.2 |
| 5,199,249 | 4/1993 | Wattron et al. | 56/15.2 |
| 5,199,250 | 4/1993 | Ermacora et al. | 56/15.2 |

FOREIGN PATENT DOCUMENTS 0126518 11/1984 European Pat. Off. .
0337909  3/1989 European Pat. Off. .
0451074  4/1991 European Pat. Off. .

*Primary Examiner*—Terry Lee Melius
*Attorney, Agent, or Firm*—Oblon, Spivak, McClelland, Maier & Neustadt

[57] ABSTRACT

A mower having a cutting mechanism which during work extends crosswise to the direction of work includes a retaining element. The retaining element prevents a pivoting of a support beam and the cutting mechanism around an axis directed upward and is installed so that during work, it has sharp inclination upward and forward.

42 Claims, 10 Drawing Sheets

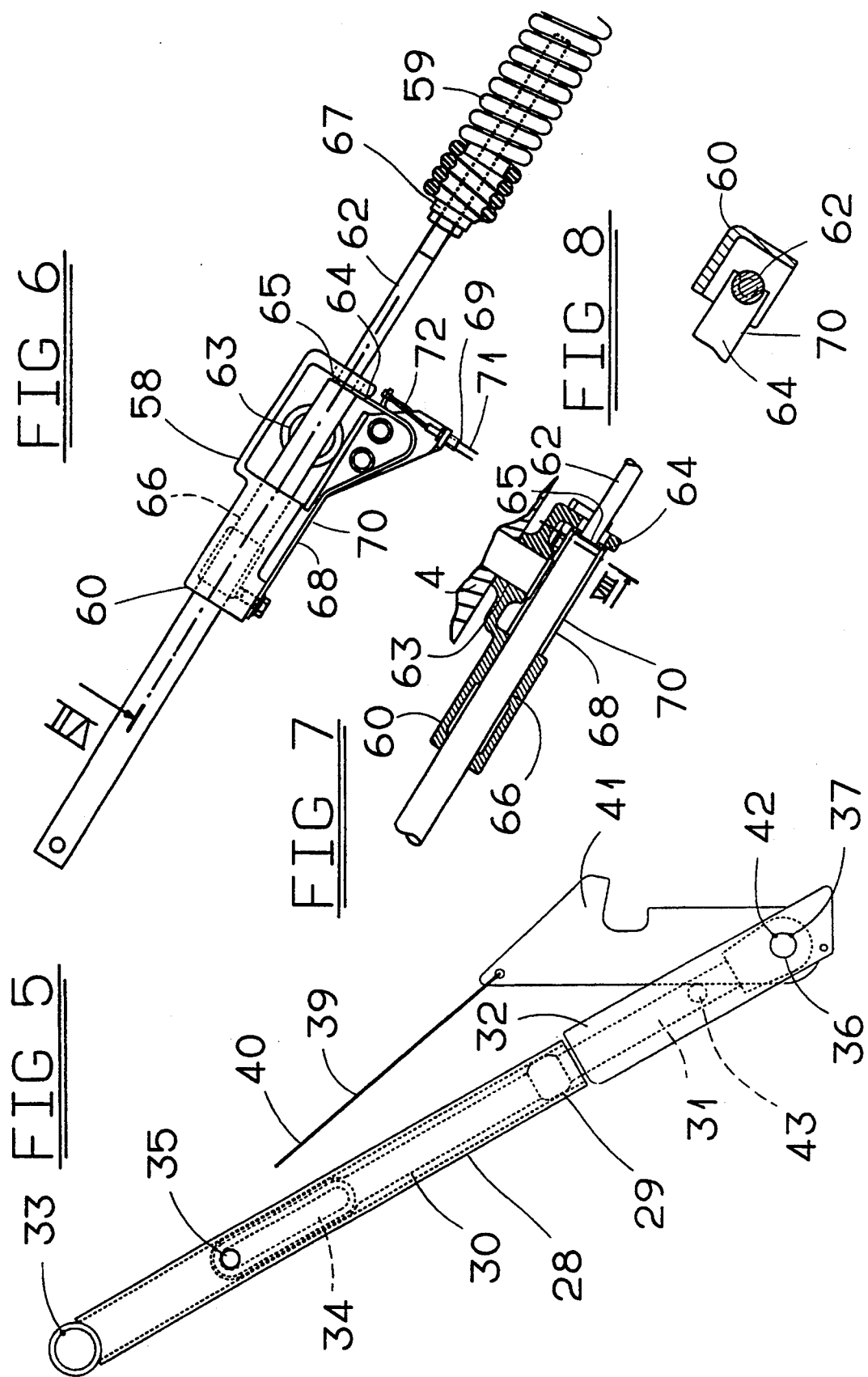

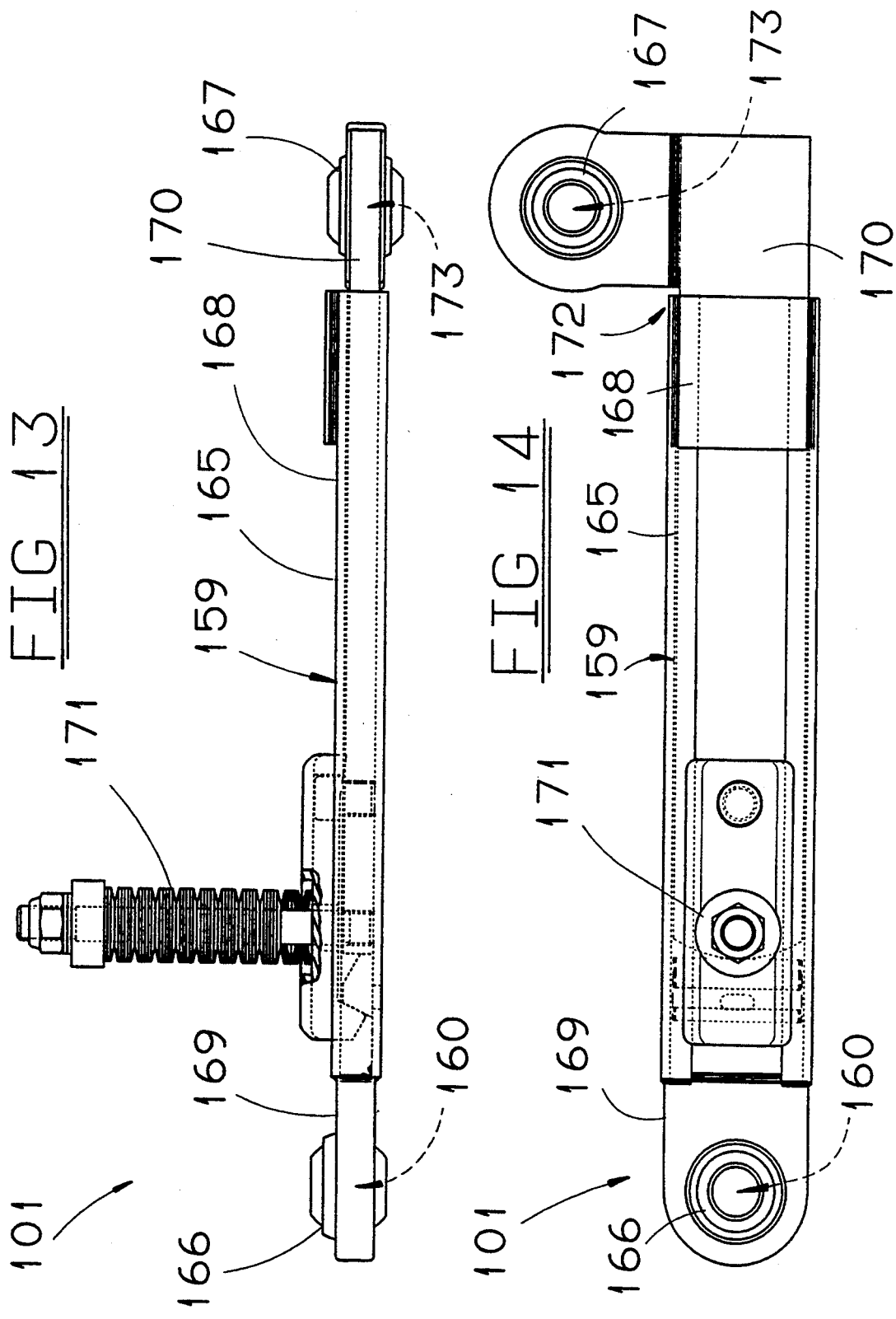

MOWER WITH DYNAMIC LOAD-LIGHTENING

BACKGROUND OF THE INVENTION

1. Field of the Invention

The present invention relates to a first type of mower which comprises a cutting mechanism which extends, during work, crosswise to a direction of work; a hitching structure for connection to a power-driven vehicle; a support beam connected at a first end to the hitching structure by a first hinge having a first forwardly directed geometric axis, and connected at a second end to the cutting mechanism with a second hinge having a second forwardly directed geometric axis, the first hinge being able to pivot in relation to the hitching structure around a third upwardly directed geometric axis; and a retaining element extending at least approximately in a vertical plane directed in the direction of work and placed between the support beam and the hitching structure for preventing, under normal work conditions, a pivoting of the support beam around the third geometric axis, a connection of the retaining element to the support beam extending during work at a height lower than that of the first geometric axis of the first hinge.

The present invention also relates to a second type of mower which comprises a cutting mechanism which extends, during work, crosswise to a direction of work; a hitching structure for connection to a power-driven vehicle; a support beam connected at a first end to the hitching structure by a first hinge having a first forwardly directed geometric axis, and connected at a second end to the cutting mechanism with a second hinge having a second forwardly directed geometric axis, the first hinge being able to pivot in relation to the hitching structure around a third upwardly directed geometric axis; and a retaining element placed between the support beam and the hitching structure for preventing, under normal work conditions, a pivoting of the support beam around the third geometric axis, a connection of the retaining element to the support beam extending during work at least approximately at the same height or above the geometric axis of the first hinge.

2. Discussion of the Related Art

In related mowers the support beam of the mower is held in its work position, in relation to the hitching structure, by a safety tie rod. This safety tie rod extends forward, parallel to the direction of work, up to the hitching structure, preventing under normal work conditions the pivoting backward of the support beam, therefore of the cutting mechanism, around a third axis directed vertically.

Related mowers also comprise a load-lightening spring that extends between the upper part of the hitching structure and the support beam. Advantageously, this load-lightening spring makes it possible to reduce the force with which the cutting mechanism rests on the ground during work.

SUMMARY OF THE INVENTION

Accordingly, an object of this invention is to improve the load-lightening of the cutting mechanism of the above-noted mowers.

For this purpose, according to the invention for the two types of mowers, it is provided that the retaining element be installed so that during work it has a sharp inclination upward and forward.

The retaining element lightens the cutting mechanism in the following manner. During work, the cutting mechanism rests on the ground with a certain force. On advancing, this force produces a resistance to the advance which is, due to the invention, advantageously used to lighten the cutting mechanism.

Actually this resistance to the advance tends to cause the support beam to pivot backward around the axis directed upward, which creates a force in the retaining element. Taking into account the sharp inclination of the retaining element, this force produces a substantial vertical component which tends to lift the outside end of the support beam, i.e., the cutting mechanism.

In the first type of mower, the retaining element extends at least approximately in a vertical plane directed in the direction of work. Because of this, the force in the retaining element does not create any detrimental torque around the first geometric axis of the first hinge, which would risk increasing the force with which the cutting mechanism rests on the ground.

In the second type of mower, since the connection connecting the retaining element to the support beam extends at least approximately at the same height or above the first geometric axis of the first hinge, the horizontal component of the force in the retaining element does not create any detrimental torque around the first geometric axis of the first hinge. In particular, when the connection is installed above the first geometric axis of the first hinge, the load-lightening of the cutting mechanism is even increased.

Due to the retaining element according to the invention, the cutting mechanism is therefore lightened in a dynamic manner.

Further, considering its slight bulk and its relative simplicity of operation, the retaining element is relatively easy to produce.

For that matter, since the retaining element is not normally subjected to any force when the mower is in its removal position, the hitching structure is able to be pivoted in relation to the support beam around the first geometric axis of the first hinge. This considerably facilitates the hitching of the mower to the power-driven vehicle.

According to an additional feature of the invention, it is provided that the connection of the retaining element to the support beam extends between the first geometric axis of the first hinge and the second geometric axis of the second hinge.

Advantageously, the connection is installed more particularly in the outside half of the support beam connected to the cutting mechanism.

In one embodiment, this connection can be located at about two-thirds of the distance separating the first geometric axis of the first hinge from the second geometric axis of the second hinge.

Furthermore, considering the direction of advance during work, this connection is installed on the front face of the support beam.

According to another feature of the invention, it is provided that the orthogonal projection of the retaining element in a vertical plane directed in the direction of work forms, with the horizontal, an angle B,B' of between 20° and 70°. This makes possible a good dynamic load-lightening of the cutting mechanism.

A particularly advantageous load-lightening is obtained when the angle B,B' is about 45°.

In the first type of mower, the retaining element which extends forward and upward, is connected to the lower part of the hitching structure.

For this purpose, the hitching structure exhibits an overall triangular shape comprising two lower hitching points and an upper hitching point, intended to be connected to the three hitching points of the power-driven vehicle, and the retaining element is connected to the hitching structure in the vicinity of the lower hitching point opposite the cutting mechanism.

In the second type of mower, the retaining element extends forward and, in top view, toward the first geometric axis of the first hinge.

In top view, this retaining element forms, in relation to the direction of work, an angle M of about 60°.

Furthermore, in this second type of mower, the hitching structure comprises a gantry comprising an upper beam and the retaining element is connected to the gantry in the vicinity of the longitudinal end of the upper beam directed toward the cutting mechanism.

As in the first type of mower, the hitching structure of the second type of mower comprises three hitching points intended to be connected to the three-point hitching of a power-driven vehicle.

For both types of mowers, the retaining element can further be connected successively to hitching structure at several connecting points each installed at a different height on the hitching structure, so as to be able to change the load-lightening force by simple changing of the connecting point.

In a further embodiment of the invention, the retaining element can be a connecting rod hinged, on the one hand, to the hitching structure by a first ball-and-socket connection and, on the other hand, to the support beam by a second ball-and-socket connection.

Advantageously, the retaining element can also be produced in the form of a safety tie rod allowing the pivoting of the cutting mechanism backward, when the latter encounters an obstacle.

According to another feature of the invention, it is further provided that, as seen in the direction of advance during work, the first geometric axis of the first hinge extends at least approximately to the center of the triangle defined by the three hitching points of the hitching structure.

In addition, the first geometric axis of the first hinge and the third geometric axis are at least approximately concurrent.

As for the second hinge, it is installed in the first type of mower, in the lower part of the cutting mechanism.

On the contrary, in the second type of mower, the second hinge is installed in the upper part of the cutting mechanism.

However, in both types of mowers, the second hinge can extend in the vicinity of the inside end of the cutting mechanism.

Because of this, the retaining element according to the invention lightens more particularly the inside end of the cutting mechanism.

According to another feature of the invention, the cutting mechanism is, in addition, lightened by a load-lightening element.

In the embodiments according to the invention in which the second hinge extends in the vicinity of the inside end of the cutting mechanism, it is provided that the load-lightening element extends between the hitching structure and the cutting mechanism.

The outside end of the cutting mechanism is thereby also lightened.

For transport, the two types of mowers also comprise an operating element that extends between the hitching structure and the cutting mechanism, so as to bring the cutting mechanism into a raised position for transport.

In addition, it is provided that during removal, the cutting mechanism extends longitudinally on the ground and that the support beam rests on the ground by a brace.

Moreover, both types of mowers can further comprise a device for processing the product cut by the cutting mechanism.

Accordingly, the invention relates to a mower which comprises a cutting mechanism which extends, during work, crosswise to a direction of work; a hitching structure for connection to a power-driven vehicle; a support beam connected at a first end to the hitching structure by a first hinge having a first forwardly directed geometric axis, and connected at a second end to the cutting mechanism with a second hinge having a second forwardly directed geometric axis, the first hinge being able to pivot in relation to the hitching structure around a third upwardly directed geometric axis; and a retaining element extending at least approximately in a vertical plane directed in the direction of work and placed between the support beam and the hitching structure for preventing, under normal work conditions, a pivoting of the support beam around the third geometric axis, a connection of the retaining element to the support beam extending during work at a height lower than that of the first geometric axis of the first hinge. The retaining element being installed so that during work the retaining element has a sharp upward and forward inclination.

The present invention also relates to a mower which comprises a cutting mechanism which extends, during work, crosswise to a direction of work; a hitching structure for connection to a power-driven vehicle; a support beam connected at a first end to the hitching structure by a first hinge having a first forwardly directed geometric axis, and connected at a second end to the cutting mechanism with a second hinge having a second forwardly directed geometric axis, the first hinge being able to pivot in relation to the hitching structure around a third upwardly directed geometric axis; and a retaining element placed between the support beam and the hitching structure for preventing, under normal work conditions, a pivoting of the support beam around the third geometric axis, a connection of the retaining element to the support beam extending during work at least approximately at the same height or above the first geometric axis of the first hinge.

BRIEF DESCRIPTION OF THE DRAWINGS

A more complete appreciation of the invention and many of the attendant advantages threreof will be readily obtained as the same becomes better understood by reference to the following detailed description when considered in connection with the accompanying drawings, wherein:

FIG. 5 represents, on a larger scale, a back view in the direction of advance during work of a locking element and of a catch intended to lock the cutting mechanism in its raised position for transport, when the user acts on a small cord of the catch;

FIG. 6 represents, on a larger scale, a view of a control device and of a portion of the draw spring;

FIG. 7 represents a section of the control device along plane VII—VII defined in FIG. 6;

FIG. 8 represents a section of the control device along plane VIII—VIII defined in FIG. 7;

FIG. 13 represents, on a larger scale, a side view of the retaining element; and FIG. 14 represents a top view of the retaining element of FIG. 13.

DESCRIPTION OF THE PREFERRED EMBODIMENTS

Figure 1:
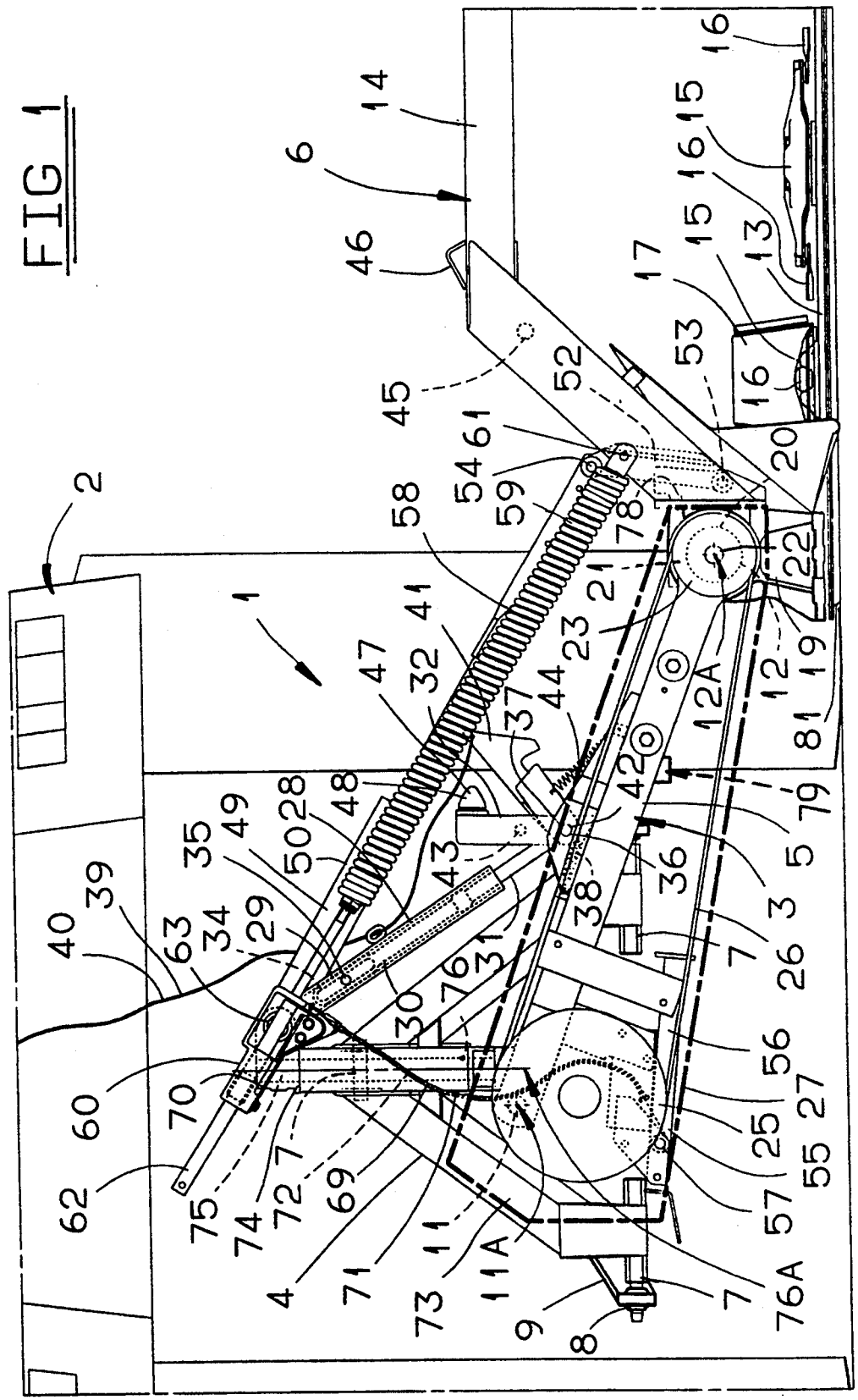
FIG. 1 represents, in a work position, a mower according to the invention as seen from the back in the direction of advance during work and connected to a power-driven vehicle.

Referring now to the drawings, wherein like reference numerals designate identical or corresponding parts throughout the several views, and more particularly to FIGS. 1–9, in which a mower (1) according to the invention is illustrated, the mower (1) is hitched to a farm tractor (2).

The mower (1) is composed mainly of a chassis (3), comprising a hitching structure (4) and a support beam (5), and a cutting mechanism (6).

Hitching structure (4) is provided, on its front part, with three hitching points (7) intended to be connected to the three hitching points (8) of a raising device (9) of the farm tractor (2). As for support beam (5), it extends, in top view during work, crosswise to the direction of work (10) and at least approximately at the same level as the hitching structure (4). At one of its longitudinal ends, the support beam (5) is hinged to hitching structure (4) by a first pivot pin (11) having a geometric axis (11A) directed forward and extending, in a view along the direction of advance (10) during work, at least approximately in the vicinity of the center of the triangle defined by the three hitching points (7) of hitching structure (4). At its other longitudinal end, support beam (5) of chassis (3) is hinged on the inside longitudinal end (81) of the cutting mechanism (6) by a second pivot pin (12) having a geometric axis (12A) directed forward. Due to this chassis, cutting mechanism (6) can, during work, extend beside the path of tractor (2) and easily adjust to the contour of the ground.

Cutting mechanism (6) comprises a cutting bar (13) surmounted by a carrying structure (14). As shown in FIGS. 1 to 4, cutting bar (13) is equipped with a plurality of disks (15) equipped on their periphery with cutting tools (16). During work, these disks (15) rotate around geometric axes directed upward. Further, in a way known to a person skilled in the art, disks (15) which each extend at a longitudinal end of cutting bar (13) are surmounted by a drum (17) that rotates around the same geometric axis as disk (15) that it surmounts. These two drums (17) gauge the windrow of product cut by cutting tools (16).

Figure 2:
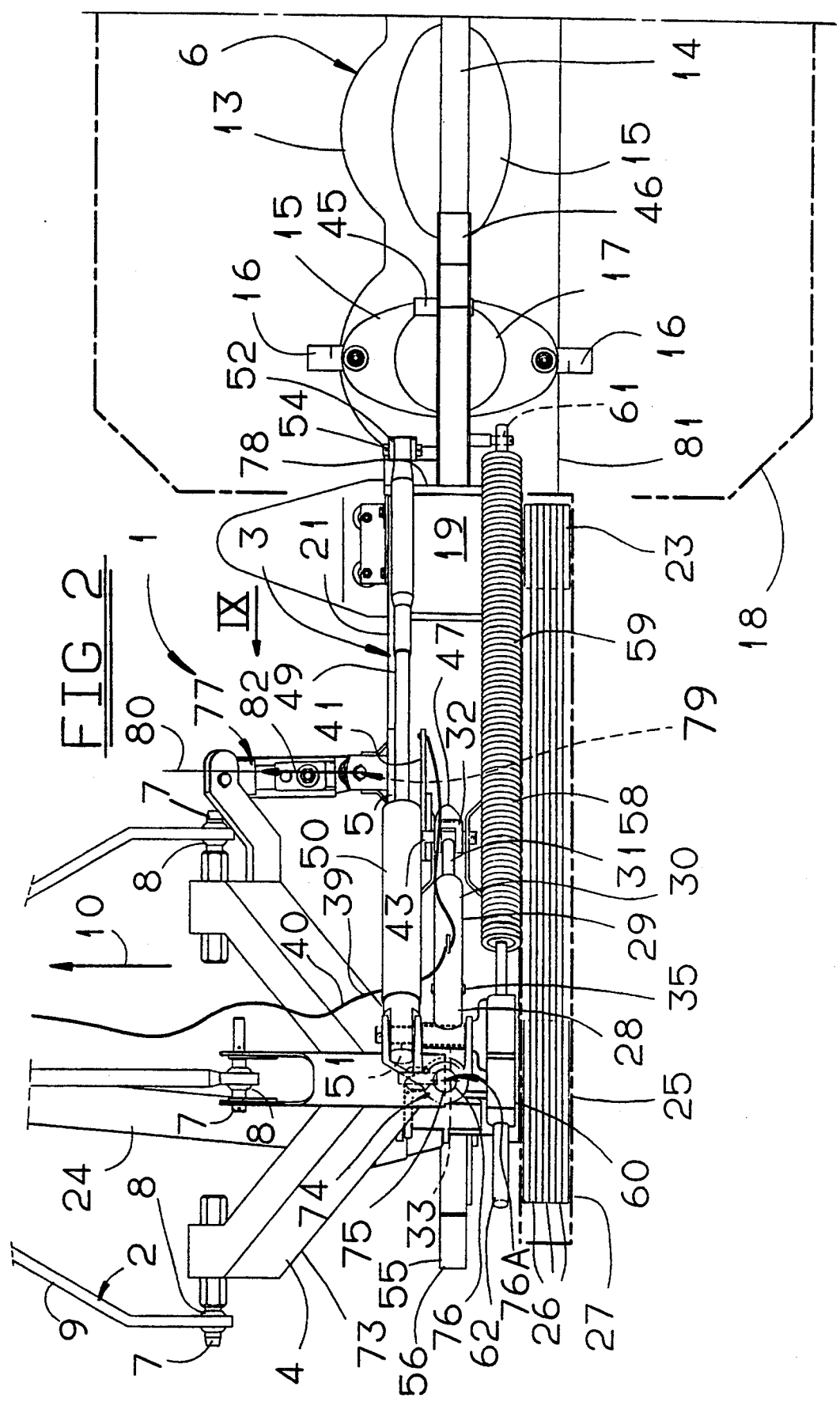
FIG. 2 represents a top view of the mower of FIG. 1 still in the work position.

Carrying structure (14) which surmounts cutting bar (13) is in particular intended to support protective elements (18) (shown in dot-and-dash lines in FIG. 2). The carrying structure (14) is fastened to cutting bar (13) by a transmission housing (19) which extends in the lower part of cutting mechanism (6). The latter fulfills a dual function: on the one hand, by it, cutting mechanism (6) is connected to support beam (5), and it contains, on the other hand, a part of the drive elements driving disks (15) and drums (17).

Transmission housing (19) is actually provided with two cylindrical bearing surfaces (20) embodying the second pivot pin (12) and able to rotate in the wings of a yoke (21) solid with support beam (5). The cylindrical bearing surfaces (20) are, in a way known to a person skilled in the art, made in the form of bearings in which an input shaft (22) is guided in rotation, whose axis of rotation is merged with the geometric axis (12A) of the second pivot pin (12). It is by means of this input shaft (22) that disks (15) and drums (17) of cutting bar (13) are driven in rotation.

In the back, input shaft (22) extends outside of transmission housing (19) and is connected in rotation with a pulley (23). The pulley (23) is part of the transmission elements of mower (1) which transmit the movement from the power take-off (not shown) of tractor (2) to input shaft (22) of transmission housing (19). These transmission elements further comprise a transmission shaft with universal joints (24) (FIG. 2), a pulley (25) and belts (26). Transmission shaft (24) is connected in rotation with pulley (25) hinged to support beam (5) and having an axis of rotation directed at least approximately in direction of advance (10) during work when mower (1) is in the mowing position (FIGS. 1 and 2). The transmission of the movement of pulley (25) to pulley (23) is assured by belts (26) which are wound on the pulleys (23, 25). A protective hood (27) (shown in dot-and-dash lines) partially surrounds pulleys (23, 25) and belts (26).

As illustrated in FIGS. 1 to 5, chassis (3) of the mower (1) according to the invention is provided with a locking element (28) intended, when desired, to lock the relative pivoting of support beam (5) in relation to the hitching structure (4) around the geometric axis (11A) of the first pivot pin (11). The locking element (28) consists of a limiting device (29), comprising a tube (30) and a rod (31), and of a lock (32).

Tube (30) is connected at one of its longitudinal ends to the upper part of hitching structure (4), by a hinge (33) (FIG. 5), exhibiting a geometric axis that is at least approximately parallel to geometric axis (11A) of the first pivot pin (11). On the inside of the tube (30) slides a portion of rod (31) provided with an oblong hole (34) with a longitudinal axis at least approximately merged with the longitudinal axis of the tube (30). A pin 35, fastened to tube (30), passes through oblong hole (34) from one side to the other, thus limiting the translation of rod (31) in tube (30). The longitudinal end of the other part of rod (31), which extends outside tube (30), is connected to the median part of support beam (5)

with a hinge (36) exhibiting, as before, a geometric axis that is at least approximately parallel to geometric axis (11A) of the first pivot pin (11). Consequently, limiting device (29) limits the pivoting of support beam (5) in relation to the hitching structure (4) around geometric axis (11A) of the first pivot pin (11), and thereby, the displacement downward of the second pivot pin (12) which connects cutting mechanism (6) to the support beam (5). The user can therefore, for transport for example, actuate raising device (9) of tractor (2), so as to elongate limiting device (29) (FIG. 5) as much as possible and to lift cutting mechanism (6).

In this "windrow" type position, limiting device (29) can be locked by lock (32). For this purpose, lock (32) is hinged to support beam (5) by a pivot connection (37), having a geometric axis that is at least approximately merged with the geometric axis of hinge (36) connecting rod (31) of limiting device (29) to the support beam (5). In this way, the lock (32) can be pivoted around the geometric axis from an unlocked position in which rod (31) slides inside tube (30) to a locked position in which lock (32) covers the part of rod (31) which extends outside tube (30). In this latter position, lock (32) prevents any translation of rod (31) inside of tube (30), therefore locking element (28) is locked.

The unlocked positioning of lock (32) is performed under the action of a spring (38). The latter is placed between support beam (5) and lock (32). Conversely, a remote control (39) makes it possible for the user to bring and to keep at least temporarily lock (32) in locked position. As shown in FIGS. 1 to 5, remote control (39) is a small cord (40), intended, on the one hand, to be manipulated by the user from tractor (2), and connected, on the other hand, to a catch (41) able to pivot lock (32) in its locked position. Actually, lock (32) comprises a pin (43) by which catch (41) pivots the lock (32) in its locked position when the user pulls on small cord (40). For this purpose, catch (41) is hinged to support beam (5) with a pivot connection (42) having a geometric axis that is at least approximately merged with the geometric axis of pivot connection (37) of lock (32). The user can therefore, when mower (1) is in windrow position, lock limiting device (29) by pulling on small cord (40).

Figure 3:
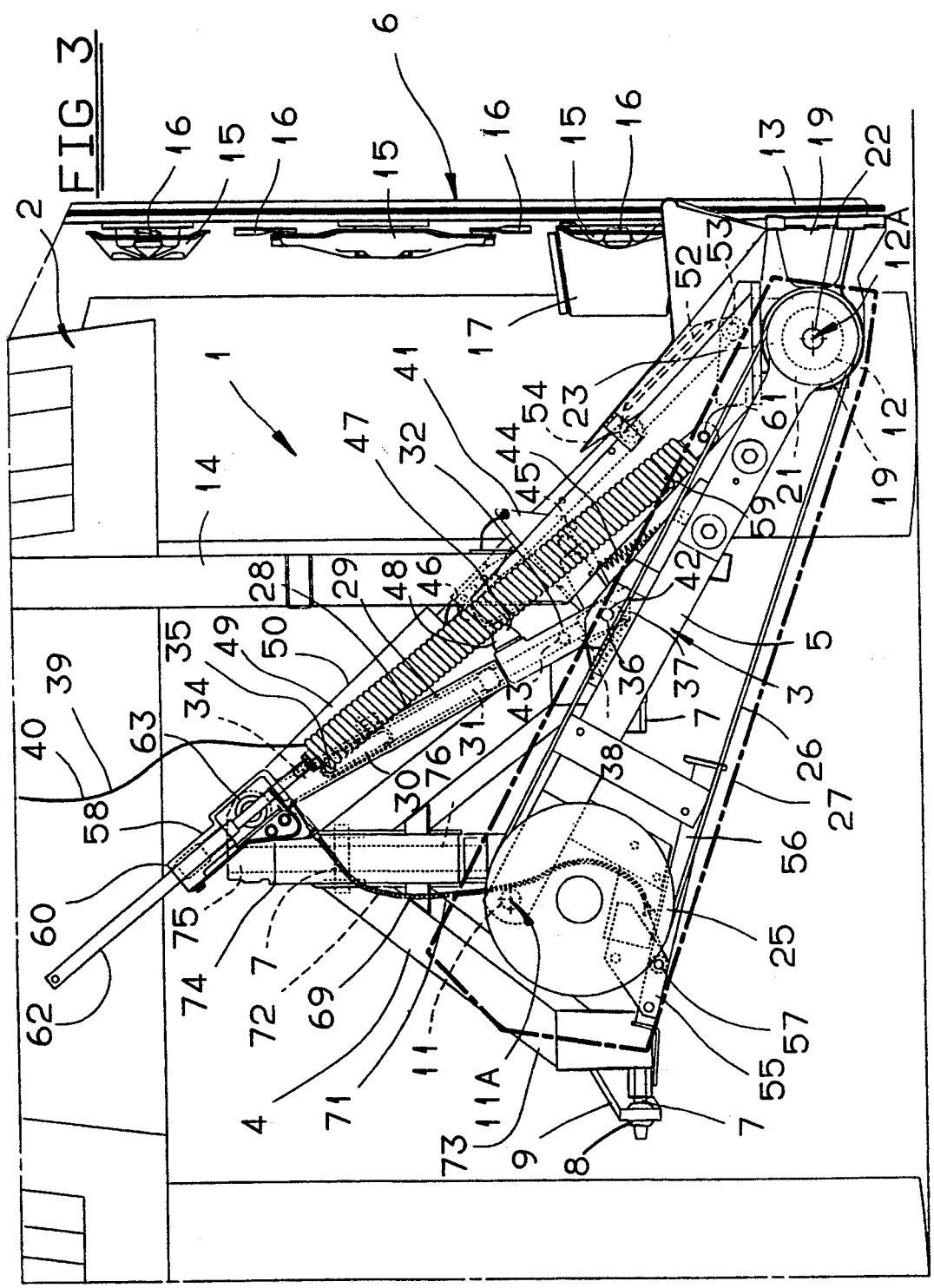
FIG. 3 represents, in a transport position, the mower of FIG. 1, as seen from the back in the direction of advance during work.

As soon as the user stops pulling on small cord (40), catch (41) pivots to its initial position under the action of a spring (44) fastened to support beam (5). Advantageously, catch (41) makes it possible, in addition, to lock cutting mechanism (6), when the latter is brought into a raised position for transport (FIG. 3) by pivoting around geometric axis (12A) of second pivot pin (12). Actually, as can be seen in FIG. 3, carrying structure (14) of cutting mechanism (6) comprises a hooking element (45) to which catch (41) is hooked when small cord (40) is relaxed. It is thus easily possible to lock cutting mechanism (6) in its raised position for transport. Unlocking of cutting mechanism (6) is performed by pivoting catch (41) against spring (44) by small cord (40).

In FIG. 3, it is illustrated that the holding of lock (32) in its locked position is assured by a holding element (46). The latter is fastened to carrying structure (14) of cutting mechanism (6) and holds lock (32) in its locked position when cutting mechanism (6) is in raised position. Consequently, as soon as cutting mechanism (6) is raised, locking element (28) is locked, which prevents the pivoting of support beam (5) in relation to hitching structure (4) around geometric axis (11A) of first pivot pin (11).

In addition, lock (32) of locking element (28) is surmounted by an elastically deformable element (47) which is made in the form of a rubber stop (48). At the end of the positioning for transport of cutting mechanism (6), holding element (46) of the cutting mechanism (6) compresses the stop (48) somewhat so that the latter, during the displacement of cutting mechanism (6) from the transport position to the windrow position, is able to start this movement.

Conversely, the passage of cutting mechanism (6) from the windrow position, where it extends at least approximately horizontally above the ground, to the raised position for transport is performed by an operating element (49). In this example of the embodiment, the operating element (49) consists of a single action hydraulic cylinder (50). The hydraulic cylinder (50) is connected at one of its longitudinal ends to hitching structure (4) by a hinge (51) (FIG. 2) and at the other of its longitudinal ends to carrying structure (14) of cutting mechanism (6) by a pivoting lever (52). The latter is connected to carrying structure (14) of cutting mechanism (6) by a pin (53) and to hydraulic cylinder (50) by an additional pin (54). Furthermore, hinge (51) connecting hydraulic cylinder (50) to hitching structure (4) and hinge (33) connecting tube (30) of locking element (28) to the hitching structure (4) are at least approximately coaxial.

During the removal of the mower (1) (FIG. 4), cutting mechanism (6) rests longitudinally on the ground and support beam (5) is supported by a removal element (55). In this example of the embodiment, removal element (55) is a brace (56) connected to the support beam (5) in the vicinity of first pivot pin (11) with a pivot connection (57) having a geometric axis that is at least approximately parallel to the geometric axis (11A) of the first pivot pin (11). Consequently, brace (56) can, for transport, be pivoted from a removal position in which brace (56) is intended to support support beam (5) into a position for transport and for work, in which brace (56) is retracted.

Figure 4:
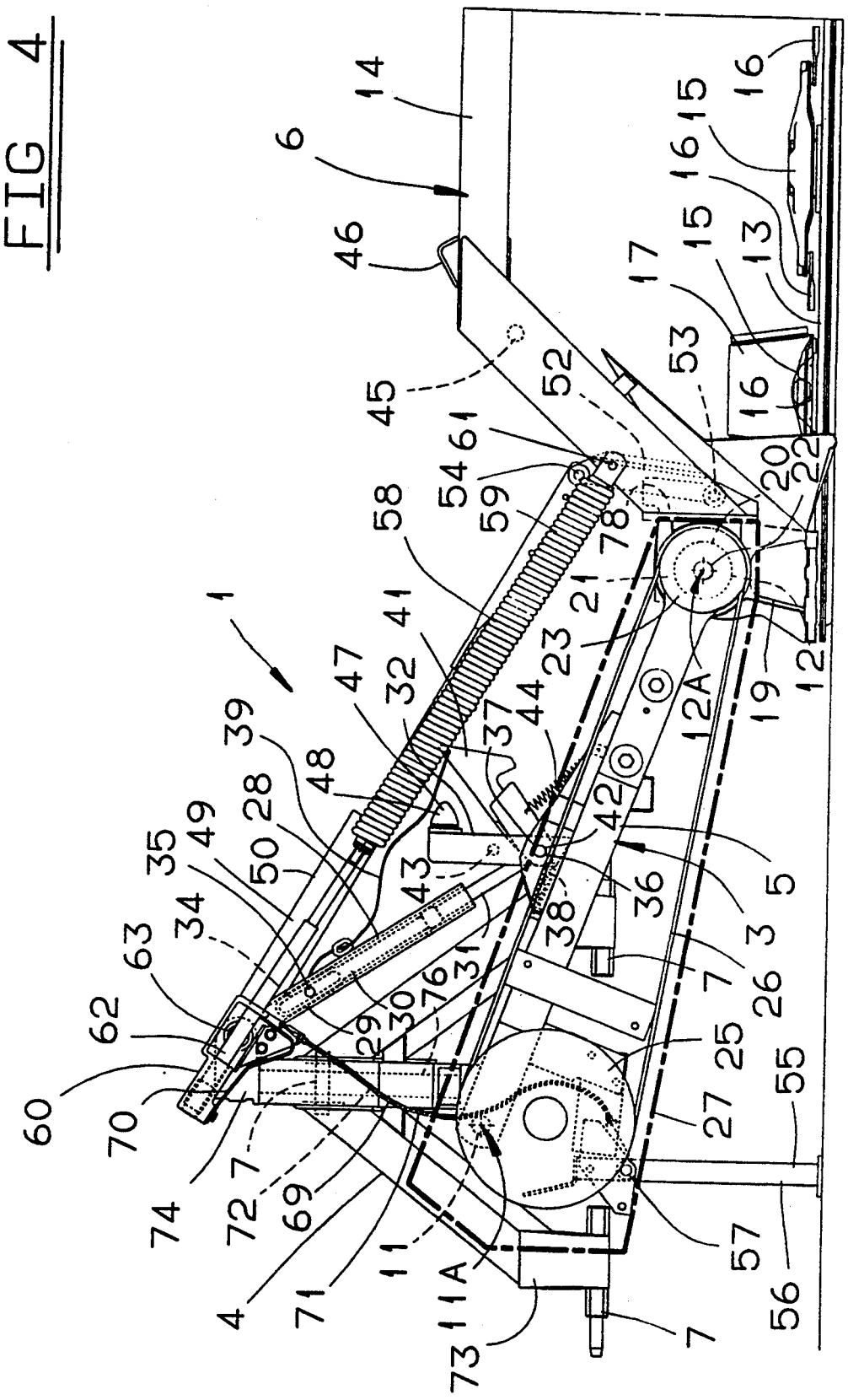
FIG. 4 represents, in a removal position, the mower of FIG. 1, as seen from the back in the direction of advance during work.

In FIG. 4 which shows the mower (1) in the removal position, it is also seen that locking element (28) is unlocked, i.e., it is possible in this position to pivot hitching structure (4) in relation to support beam (5) around geometric axis (11A) of first pivot pin (11). The arrangement considerably facilitates the hitching of mower (1) to the three points (8) of raising device (9) of tractor (2).

Mower (1) according to the invention also comprises a draw element (58) intended to lighten cutting mechanism (6) during work. The draw element (58) extends between hitching structure (4) and cutting mechanism (6) and is composed mainly of a draw spring (59) associated with a control device (60). Actually, draw spring (59) is hinged, on the one hand, to cutting mechanism (6) by a pivot connection (61) having a geometric axis that is at least approximately parallel to geometric axis (12A) of second pivot pin (12) and, on the other hand, to control device (60) by a tie rod (62) having a geometric axis that is at least approximately merged with the longitudinal axis of the draw spring (59). As for control device (60), it is hinged to hitching structure (4) with a pivot connection (63) having a geometric axis that is at least approximately parallel to the geometric axis (11A) of the first pivot pin (11). Advantageously, in this embodiment according to the invention, the pivot connection (63) connecting control device (60) to hitching structure (4) and hinge (51) connecting hydraulic cylinder (50) to the hitching structure (4) are at least approximately coaxial.

Control device (60) appears more particularly in FIGS. 6 to 8. This device makes it possible to cancel the action of draw spring (59) for removal, so as to be able to allow the pivoting of hitching structure (4) around geometric axis (11A) of first pivot pin (11). For this purpose, control device (60) comprises a retractable stop (64) that can be put in contact with a shoulder (65) of tie rod (62). The stop (64) can therefore occupy two positions: a work position in which shoulder (65) of tie rod (62) rests against the stop (64), which makes it possible for draw spring (59) to reduce the weight of cutting mechanism (6), and a removal position in which the stop (64) is retracted, which makes it possible for tie rod (62) to be translated in control device (60), when cutting mechanism (6) extends longitudinally on the ground. Advantageously, tie rod (62) is guided in control device (60) by a cylindrical connection (66) and one of its longitudinal ends is screwed into a connecting element (67) integral with draw spring (59). Due to this arrangement, the load-lightening force of draw spring (59) can easily be adjusted by screwing tie rod (62) more or less deeply in connecting element (67) of draw spring (59).

The putting into the work position of stop (64) is performed by a spring (68), while a remote control (69) controls the putting into removal position of stop (64). As shown in FIGS. 1, 3, 4, 6, 7 and 8, stop (64) and its spring (68) are advantageously combined in a blade spring (70) whose free end has a fork shape. It is also seen in some of these FIGS. that remote control (69) of control device (60) is actuated with brace (56), so that when the latter is found in its work position, draw spring (59) can lighten cutting mechanism (6), and conversely when brace (56) is found in its removal position, the action of draw spring (59) is cancelled. For this purpose, in this example of the embodiment according to the invention, remote control (69) of control device (60) comprises a sheath (71) on the inside of which a cable (72) can be translated, connected, on the one hand, to brace (56) and, on the other hand, to stop (64) of control device (60). Consequently, as soon as brace (56) is displaced from its work position to its removal position, or vice versa, this has the effect of translating cable (72) in sheath (71) and of bringing stop (64) closer or of moving it farther away from tie rod (62).

It is further possible to see in FIGS. 1 to 4 that hitching structure (4) of the mower (1) according to the invention consists of a frame (73), of overall triangular shape, supporting the three hitching points (7), and of a connecting device (74), connecting the frame (73) to first pivot pin (11). The connecting device (74) comprises a vertical pivot pin (75) connected at its lower end to first pivot pin (11) and hinged to frame (73) of hitching structure (4) with a pivot connection (76) with vertical geometric axis (76A). In addition, at the upper end of pivot pin (75) of connecting device (74) are fastened control device (60) of draw element (58), tube (30) of locking element (28) and one longitudinal end of hydraulic cylinder (50). Due to the arrangement, cutting mechanism (6) and support beam (5) are mounted to pivot in relation to frame (73) around geometric axis (76A) of pivot connection (76) of connecting device (74).

Figure 9:
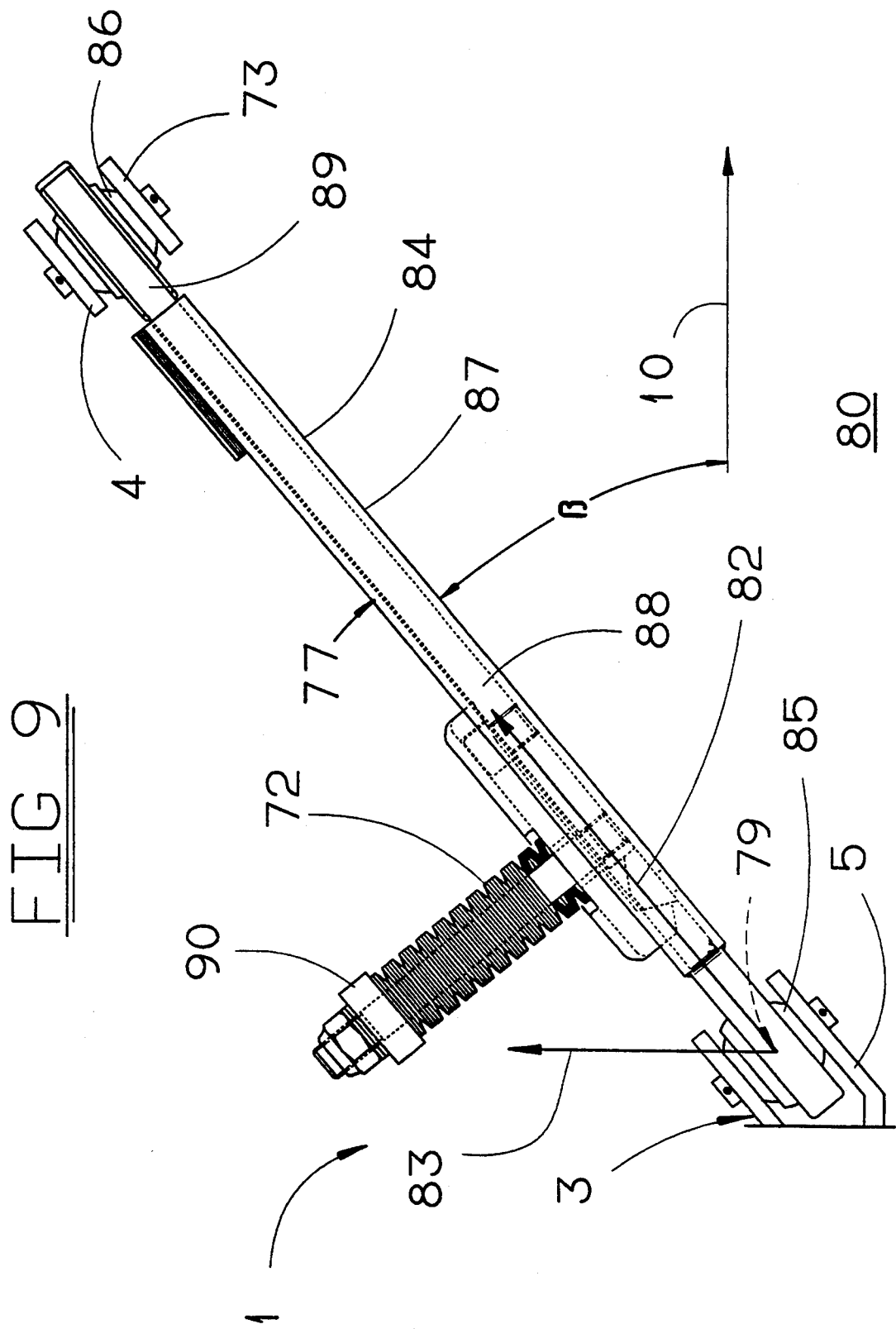
FIG. 9 represents, on a larger scale, the retaining element seen along arrow IX defined in FIG. 2.

According to the invention, the mower (1) further comprises a retaining element (77) (FIGS. 2 and 9) placed between support beam (5) and frame (73) of hitching structure (4), preventing under normal work conditions, the pivoting of support beam (5) around geometric axis (76A) of pivot connection (76). Seen in the direction of work (10), connection (79) of retaining element (77) to support beam (5) extends at a height clearly lower than that of geometric axis (11A) of first pivot pin (11) and about at two-thirds of the distance separating geometric axis (11A) of first pivot pin (11) from geometric axis (12A) of second pivot pin (12). Moreover, the connection (79) is installed on the front face of support beam (5). As shown in FIGS. 2 and 9, the retaining element (77) is installed so that during work, it has a sharp inclination upward and forward. Actually, retaining element (77) which extends at least approximately in a vertical plane (80) directed in direction of work (10), forms with the horizontal an angle ($\beta$) of about 45° (FIG. 9). At its other longitudinal end, retaining element (77) is connected to frame (73) of hitching structure (4) in the vicinity of lower hitching point (7) opposite cutting mechanism (6).

The retaining element (77) operates in the following manner.

During work, cutting mechanism (6) rests on the ground with a certain force. On advancing, this force produces a resistance to the advance which, due to the invention, is advantageously used to lighten inside end (81) of cutting mechanism (6).

Actually, this resistance to the advance tends to cause support beam (5) to pivot backward around geometric axis (76A) of pivot connection (76). This creates a pulling force (82) in retaining element (77). Taking into account the sharp inclination of retaining element (77), this pulling force (82) produces a substantial vertical component (83) which tends to lift the outside end of support beam (5), i.e., inside end (81) of cutting mechanism (6).

Mower (1) of FIGS. 1 to 9 which has just been described operates in the following manner.

Mower (1) is connected to the three hitching points (8) of raising device (9) of tractor (2) by its hitching structure (4), and the transmission shaft with universal joints (24) is coupled to the power take-off (not shown) of the tractor (2).

During work, cutting mechanism (6) extends into its work position, as shown in FIGS. 1 and 2. Tractor (2) displaces mower (1) in direction of advance (10) during work and its power take-off drives disks (15) in rotation by transmission elements (24, 25, 26, 23, 22) and by various drive elements housed in transmission housing (19) and cutting bar (13).

By rotating, cutting tools (16) of disks (15) cut the product to be harvested which is found in the cutting zone and drums (17) gauge the windrow of cut product deposited behind cutting mechanism (6).

Since support beam (5) pivots somewhat around geometric axis (11A) of first pivot pin (11) and cutting mechanism (6) pivots around geometric axis (12A) of second pivot pin (12) in relation to support beam (5), the cutting mechanism (6) can adjust well to the contour of the terrain to be mowed. On advancing, retaining element (77) uses the resistance to the advance of cutting mechanism (6) to lighten inside end (81) of the cutting mechanism (6). As for draw spring (59), it reduces more particularly the force with which the outside end of cutting mechanism (6) rests on the ground.

Moreover, since retaining element (77) extends at least approximately in a vertical plane (80) directed in direction of work (10), pulling force (82) in retaining element (77) does not create any detrimental torque around geometric axis (11A) of first pivot pin (11).

When it is desired to the transport mower 1, the driving in rotation of disks (15) is stopped.

To place mower (1) in the transport position (FIG. 3), first the three hitching points (8) of raising device (9) of tractor (2) are lifted, which has the effect of lifting mower (1) as soon as the pivoting of support beam (5) downward around geometric axis (11A) of first pivot pin (11) is stopped by limiting device (29) of locking element (28), and pivoting lever (52) strikes against transmission housing (19) which comprises a support face (78) provided for this purpose. In this windrow position (not shown) where cutting mechanism (6) extends at least approximately horizontally above the ground, remote control (39) is then acted on, which causes catch (41) to pivot into the unlocked position (FIG. 5). By so doing, catch (41) drives the lock (32) into the locked position for transport. While maintaining the action on remote control (39), the pivoting of cutting mechanism (6) around geometric axis (12A) of second pivot pin (12) is, in addition, controlled by operating element (49). Since cutting mechanism (6) is in its raised position for transport, the action of remote control (39) is discontinued to make it possible for catch (41) to be hooked on hooking element (45) of cutting mechanism (6) under the action of spring (44). Furthermore, holding element (46) of cutting mechanism (6) compresses elastically deformable element (47) and keeps lock (32) in the locked position. The transport can therefore begin.

Advantageously, cutting mechanism (6) is thus immobilized in relation to hitching structure (4), which considerably limits the swinging of the cutting mechanism (6).

To remove mower (1) (FIG. 4), the user first puts removal element (55) in removal position. By so doing, remote control (69) which connects removal element (55) to control device (60), retracts stop (64) by moving it away from tie rod (62). As can be seen in FIG. 3, such an operation is perfectly possible, considering the fact that during transport shoulder (65) of tie rod (62) is no longer in contact with stop (64). The user then acts on the other remote control (39), which separates catch (41) from hooking element (45) of cutting mechanism (6). The latter is then no longer locked and the action of elastically deformable element (47) on cutting mechanism (6) is enough to begin the pivoting of cutting mechanism (6) around geometric axis (12A) of second pivot pin (12), as soon as the user authorizes the return to tractor (2) of the oil of hydraulic cylinder (50). By so doing, cutting mechanism (6) pivots toward its windrow position under the action of its weight, while being damped by the flow of the oil of hydraulic cylinder (50) which returns to tractor (2). As soon as cutting mechanism (6) has pivoted by a certain angle, the user discontinues the action of remote control (39), which has the effect of bringing back at least approximately simultaneously catch (41) close to its initial position, under the action of its spring (44), and lock (32) into unlocked position under the action of the other spring (38).

The pivoting of cutting mechanism (6) downward is stopped when the rod of hydraulic cylinder (50) has entirely emerged. By then lowering the three hitching points (8) of raising device (9) of tractor (2), cutting mechanism (6) is brought in contact with the ground. By continuing to lower raising device (9), support beam (5) pivots around geometric axis (11A) of first pivot pin (11), which has the effect of separating pivoting lever (52) from support face (78) of transmission housing (19). The descent of support beam (5) is stopped when in this example of embodiment brace (56) rests on the ground, i.e., when pin (35) of limiting device (29) is at least approximately in the middle of oblong hole (34) of rod (31). Mower (1) then rests longitudinally on the ground by cutting mechanism (6) and brace (56). Mower (1) can therefore be unhitched from tractor (2).

When mower (1) is removed, as shown in FIG. 4, draw spring (59) is relaxed and tie rod (62) can be translated in control device (60).

In addition, since retaining element (77) is not subjected to any force when mower (1) is in its removal position, the hitching and the removal of the mower (1) are simplified. Actually, in removal position, retaining element (77) allows a pivoting of hitching structure (4) in relation to support beam (5) around geometric axis (11A) of first pivot pin (11) within the limit allowed by limiting device (29) or by retaining element (77).

Other advantages of retaining element (77) will be set out in the detailed description of the retaining element (77) which will be made later.

To bring mower (1) from its removal position to its transport position, the various operations will be done in reverse. This means that it is begun by connecting the three hitching points (7) of hitching structure (4) to the three hitching points (8) of raising device (9) of tractor (2) by pivoting, if necessary, hitching structure (4) around geometric axis (11A) of first pivot pin (11), and transmission shaft with universal joints (24) is coupled to the power take-off (not shown) of tractor (2). Then the three hitching points (8) of raising device (9) of tractor (2) are lifted, which has the effect of lifting the entire mower (1). The user then actuates remote control (39) to lock limiting device (29). While maintaining this action, he feeds operating element (49) so as to raise cutting mechanism (6) to its transport position. As soon as cutting mechanism (6) is in its raised position for transport, the user discontinues the action of remote control (39) to make it possible for catch (41) to be hooked to hooking element (45) of cutting mechanism (6) under the action of spring (44). Furthermore, holding element (46) of cutting mechanism (6) compresses elastically deformable element (47) and holds lock (32) in locked position. All that remains is to manually retract removal element (55), which by remote control (69) brings stop (64) closer to tie rod (62). The transport can then begin.

To place mower (1) in the work position, it is begun by acting on remote control (39) of catch (41) and the return to tractor (2) of the oil contained in hydraulic cylinder (50) is simultaneously authorized. By so doing, cutting mechanism (6) pivots toward its windrow position. As soon as cutting mechanism (6) has pivoted a certain angle, the action of remote control (39) is discontinued, which has the effect of bringing back at least approximately simultaneously catch (41) close to its initial position, under the action of its spring (44), and lock (32) into unlocked position under the action of the other spring (38).

The pivoting of cutting mechanism (6) downward is stopped when the rod of hydraulic cylinder (50) has entirely emerged. By then lowering the three hitching points (8) of raising device (9) of tractor (2), cutting mechanism (6) is brought in contact with the ground. Nevertheless, raising device (9) is continued to be lowered until limiting device (29) is half open, so that pivoting lever (52) is separated from support face (78) of transmission housing (19) and pin (35) of limiting device (29) is at least approximately in the middle of oblong hole (34) of rod (31). Finally, disks (15) are driven in rotation so that the work can begin.

Retaining element (77) which appears in detail in FIGS. 2 and 9 is a connecting rod (84), hinged, on the one hand, to support beam (5) by a first ball-and-socket connection (85) and, on the other hand, to hitching structure (4) by a second ball-and-socket connection (86).

Considering its slight bulk and its relative simplicity of operation, retaining element (77) is relatively easy to produce.

Advantageously, retaining element (77) further comprises a safety tie rod (87) allowing backward pivoting of cutting mechanism (6), when the latter encounters an obstacle. This tie rod (87), known to a person skilled in the art, comprises two longitudinal parts (88, 89) mounted to slide in one another, and a trigger device (90). The latter holds the two longitudinal parts (88, 89) in position in relation to one another, under normal work conditions.

FIGS. 10 to 14 show another example of an embodiment of a mower (101) according to the invention. The mower (101) is hitched to a farm tractor (102) and comprises, in similar or identical forms, almost all of the means of mower (1) previously described; because of this, these means will not all be redescribed in detail.

The mower (101) is composed mainly of a chassis (103) and a harvesting mechanism (104). Chassis (103) comprises mainly a hitching structure (105) and a support beam (106).

Hitching structure (105) comprises a gantry (107) provided, on its front part, with three hitching points (108) intended to be connected to three hitching points (109) of farm tractor (102). Between gantry (107) and support beam (106), a positioning arm (110) is installed that is used to bring support beam (106) and harvesting mechanism (104) back to the median plane of tractor (102), to facilitate its transport. For this purpose, positioning arm (110) of hitching structure (105) is connected, on the one hand, at least approximately at the center of upper beam (111) of gantry (107), by a cylindrical hinge (112) having an at least approximately vertical geometric axis (112A), and on the other hand, in the vicinity of the inside longitudinal end of support beam (106) with a pivot pin (113) having an at least approximately vertical geometric axis (113A). A positioning element (114), made in the form of a hydraulic cylinder, is installed between positioning arm (11) and the end of gantry (107) opposite harvesting mechanism (104). In this way, the positioning arm (110) can be pivoted around geometric axis (112A) of cylindrical hinge (112) from a removal and work position (FIGS. 10 and 11), in which it extends at least approximately in direction of work (115), to a transport position (not shown) in which the positioning arm (110) is at least approximately parallel to upper beam (111) of gantry (107).

As for support beam (106), it extends in top view during work, crosswise to direction of work (115) and at least approximately at the same level as hitching structure (105). At its inside longitudinal end, support beam (106) is hinged to the lower part of pivot pin (113) by a first pivot connection (116) having a geometric axis (116A) directed forward and extending, in a view along direction of advance (115) during work, at least approximately in the vicinity of the center of the triangle defined by the three hitching points (108) of hitching structure (105). At its outside longitudinal end, support beam (106) of chassis (103) is hinged on the inside longitudinal end (124) of harvesting mechanism (104) by a second pivot connection (117) having a geometric axis (117A) directed forward. The second pivot connection (117) is installed in the upper part of harvesting mechanism (104), so that during work, the geometric axes (116A, 117A) of the two corresponding pivot connections (116, 117) extend at least approximately at the same level, which makes it possible for support beam (106) to be directed at least approximately horizontally. Due to the chassis (103), harvesting mechanism (104) can extend, during work, beside the path of tractor (102) and easily adjust to the contour of the ground.

Figure 10:
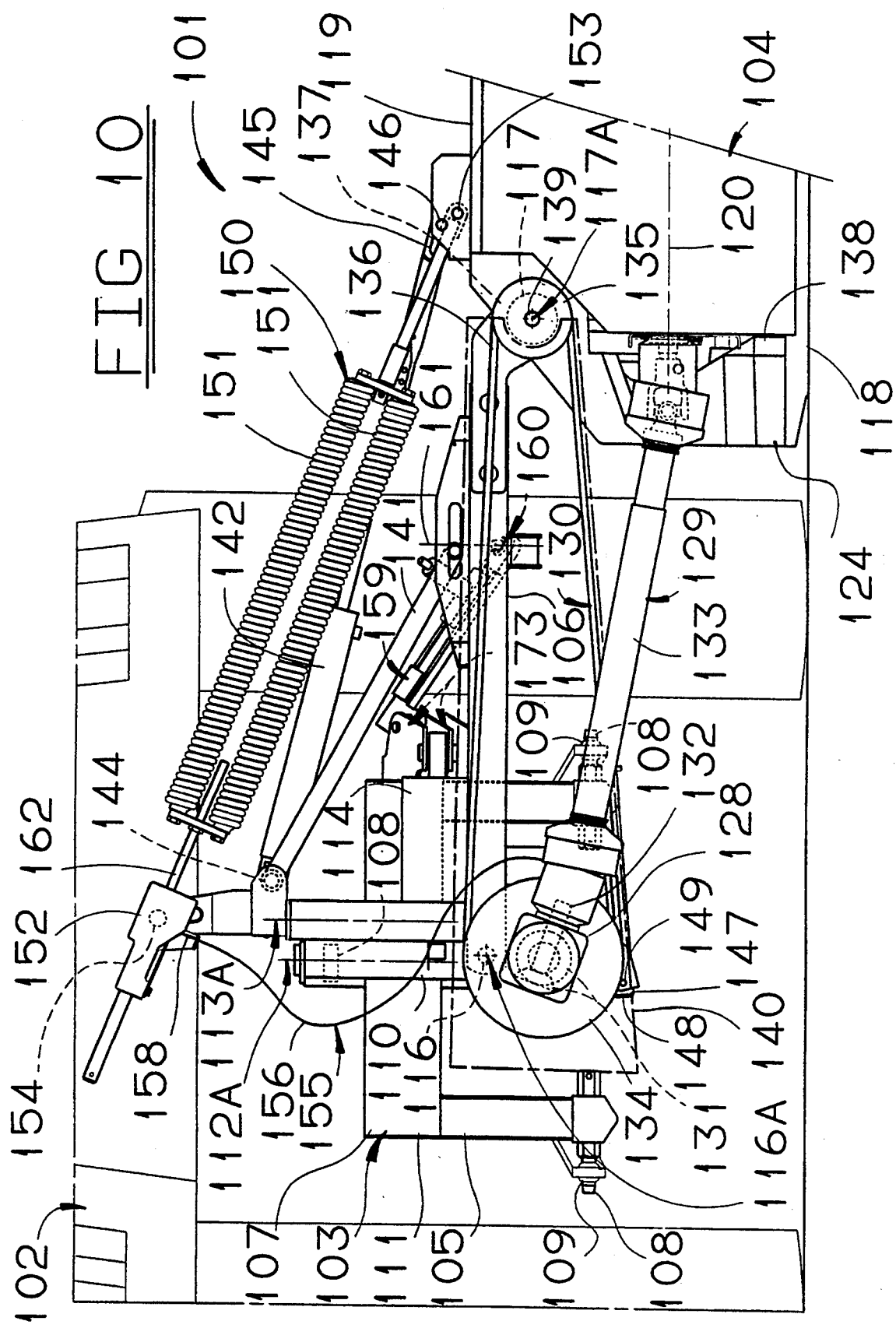
FIG. 10 represents, in a work position, another example of an embodiment of a mower according to the invention as seen from the back in the direction of advance during work and connected to a power-driven vehicle.
Figure 11:
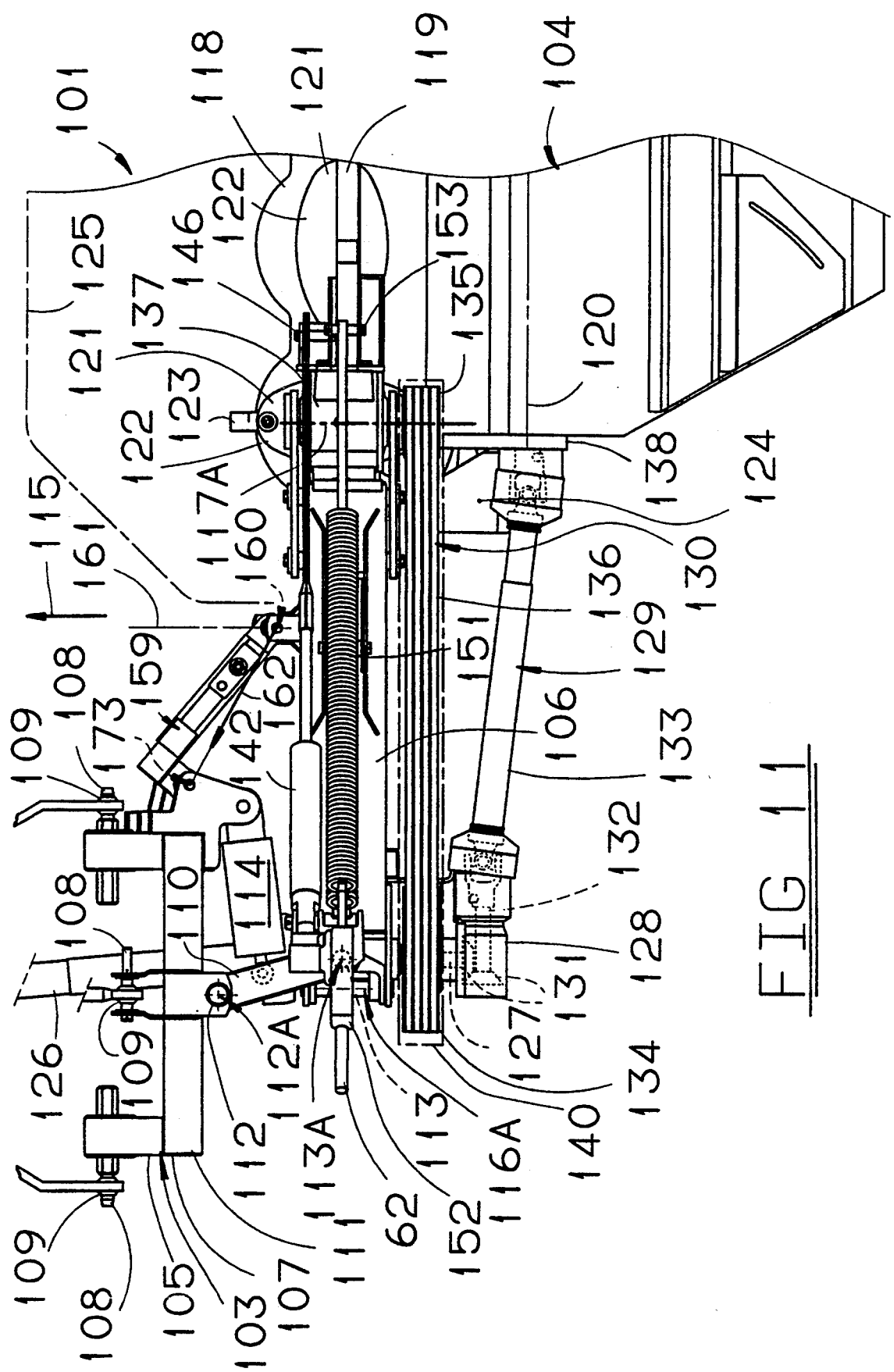
FIG. 11 represents a top view of the mower of FIG. 10 still in the work position.

As shown in FIGS. 10 and 11, harvesting mechanism (104) comprises a cutting bar (118), a carrying structure (119) and a processing rotor (120), of which only the axis of rotation is seen. Cutting bar (118) is equipped with a plurality of cutting elements (121) comprising disks (122) provided on their periphery with cutting tools (123). During work, these disks (122) rotate around geometric axes directed upward. Further, in a way known to a person skilled in the art, disks (122) which each extend at a longitudinal end of cutting bar (118) are surmounted by a drum (not shown), rotating around the same geometric axis as the disk (122) that it surmounts. These two drums gauge the flow of product cut by cutting elements (121).

Furthermore, above cutting bar (118) extends carrying structure (119) which is particularly intended to support protective elements (125) (represented in dot-and-dash lines in FIG. 11). The carrying structure (119) is connected to cutting bar (118) by two side walls (138) extending downward.

Processing rotor (120), known to a person skilled in the art, extends behind cutting bar (118) and at least approximately parallel to the longitudinal axis of cutting bar (118). The processing rotor (120) is guided in rotation in the vicinity of its longitudinal ends in side walls (138) of carrying structure (119) and is intended to pack the product cut by cutting elements (121).

The driving in rotation of processing rotor (120) and disks (122) of cutting bar (118) is performed from tractor (102) to which mower (101) is hitched. Actually, it is the power take-off (not shown) which drives, by a telescopic shaft with universal joints (126), input shaft (127) of a transmission housing (128). The input shaft (127) transmits the movement of rotation, on the one hand, to processing rotor (120) by drive elements (129), and on the other hand, to disks (122) of cutting bar (118) with transmission elements (130).

To communicate the movement of input shaft (127) of transmission housing (128) to processing rotor (120), drive elements (129) comprise successively a pair of bevel gears (131), one of which is integral with the input shaft (127) and the other with output shaft (132) of transmission housing (128), and a telescopic shaft with universal joints (133) extending crosswise to direction of work (115). The telescopic shaft with universal joints (133) communicates the movement of rotation of output shaft (132) of transmission housing (128) to processing rotor (120), the longitudinal end of which, for this purpose, passes through inside side wall (138) of carrying structure (119).

The transmission of the movement of rotation of input shaft (127) of transmission housing (128) to disks (122) of cutting bar (118) is performed, as stated previously, by transmission elements (130). The latter comprise mainly a pair of pulleys (134, 135) on which belts (136) are wound and a transmission housing (137), by which carrying structure (119) of harvesting mechanism (104) is connected to support beam (106).

Transmission housing (137) is actually provided with two cylindrical bearing surfaces embodying second pivot connection (117) and made in the form of bearings in which an input shaft (139) is guided in rotation whose axis of rotation is merged with geometric axis (117A) of the second pivot connection (117). By this input shaft (139), disks (122) and the drums of cutting bar (118) are driven in rotation.

In the back, input shaft (139) extends outside of transmission housing (137) and carries one (135) of the pulleys (134, 135) of transmission elements (130). The other pulley (134) is carried by input shaft (127) of transmission housing (128) which is installed in the vicinity of hitching structure (105). The transmission of the movement of the pulley (134) to pulley (135) is assured by belts (136) which are wound on the pulleys (134, 135). A protective hood (140) (shown in dot-and-dash lines) partially surrounds pulleys (134, 135) and belts (136).

As FIGS. 10 and 11 show, chassis (103) also comprises a limiting device (141) that is used to limit the pivoting of support beam (106) around geometric axis (116A) of first pivot connection (116) and thereby, the displacement downward of second pivot connection (117) which connects harvesting mechanism (104) to support beam (106). The user can therefore, for transport for example, actuate the raising device of tractor (102) so as to elongate as much as possible limiting device (141) and lift harvesting mechanism (104).

To lift harvesting mechanism (104) entirely and to keep it in a windrow position, a raising cylinder (142) is further provided. This raising cylinder (142) is hinged at one of its longitudinal ends near the upper end of pivot pin (113) of hitching structure (105) by a hinge (144) whose geometric axis extends at least approximately parallel to geometric axis (116A) of first pivot connection (116).

At its other longitudinal end, raising cylinder (142) exhibits an oblong hole (145) through which a pin (146) passes that is directed at least approximately in direction of work (115) and fastened to carrying structure (119) of harvesting mechanism (104). During work, pin (146) normally extends in the middle of oblong hole (145) and therefore does not interfere with the displacement in height of harvesting mechanism (104), or its pivoting around geometric axis (117A) of second pivot connection (117). Further, when the user wishes to place mower (101) in its windrow position by actuating the hydraulic raising of tractor (102), chassis (103) and the upper end of raising cylinder (142) are displaced upward, bringing the lower end of oblong hole (145) against pin (146) of harvesting mechanism (104). Therefore, harvesting mechanism (104) no longer pivots around geometric axis (117A) of second pivot connection (117), but moves away from the ground. Once in its windrow position, mower (101) can then be placed in its transport position due to positioning cylinder (114) which brings harvesting mechanism (104) back to the median plane of tractor (102) and to raising cylinder (142) which makes it possible to pivot harvesting mechanism (104) into a vertical transport position (not shown).

During the removal of the mower (101), harvesting mechanism (104) rests longitudinally on the ground and support beam (106) is supported by a removal element (147) (FIG. 10). In this example of the embodiment, removal element (147) is a brace (148) connected to support beam (106) in the vicinity of first pivot connection (116), with a cylindrical hinge (149) having a geometric axis at least approximately parallel to geometric axis (116A) of the first pivot connection (116). Because of this, brace (148) can, for removal, be pivoted from a transport or work position, in which brace (148) is retracted, into a removal position in which brace (148) is intended to support support beam (106).

In removal position, it is also possible to pivot hitching structure (105) in relation to support beam (106) around geometric axis (116A) of first pivot connection (116). Such an arrangement substantially facilitates the hitching of mower (101) to the three hitching points (109) of tractor (102).

Mower (101) further comprises a load-lightening element (150) intended to lighten harvesting mechanism (104) during work. The load-lightening element (150) extends between the upper end of pivot pin (113) of hitching structure (105) and the inside end of carrying structure (119). Load-lightening element (150) is composed mainly of at least one draw spring (151) associated with a control device (152). Actually, two draw springs (151) are hinged, on the one hand, to carrying structure (119) of harvesting mechanism (104), by a pin (153) directed at least approximately parallel to geometric axis (117A) of second pivot connection (117) and, on the other hand, to control device (152), by a tie rod (162) having a geometric axis that is at least approximately parallel to the longitudinal axis of each of the draw springs (151). As for control device (152), it is hinged to pivot pin (113) with a cylindrical hinge (154) having a geometric axis that is at least approximately parallel to geometric axis (117A) of second pivot connection (117). In this embodiment, the cylindrical hinge (154), connecting control device (152) to hitching structure (105), extends above hinge (144) connecting raising cylinder (142) to the hitching structure (105).

Control device (152) which is identical with the one which was described in the previous example of the embodiment, makes it possible to cancel the action of draw springs (151) for the removal, so as to allow, as previously stated, the pivoting of hitching structure (105) around geometric axis (116A) of first pivot connection (116). For this purpose, control device (152) comprises a remote control (155) which comprises a sheath (156) inside of which a cable (not shown) can be translated and that is connected, on the one hand, to brace (148) and, on the other hand, to a retractable stop (158) of control device (152). Consequently, as soon as brace (148) is displaced from its work position to its removal position, this has the effect of acting on control device (152) and of canceling the action of draw springs (151) by retracting stop (158).

According to the invention, the mower (101) furthermore comprises a retaining element (159) placed between support beam (106) and hitching structure (105), preventing under normal work conditions, the pivoting of support beam (106) around geometric axis (113A) of pivot pin (113). Seen in direction of work (115), connection (160) of retaining element (159) to support beam (106) extends at least approximately at the same level as geometric axis (116A) of first pivot connection (116) and about at two-thirds of the distance separating geometric axis (116A) of first pivot connection (116) from geometric axis (117A) of second pivot connection (117). Furthermore, the connection (160) is installed on the front face of support beam (106).

Figure 12:
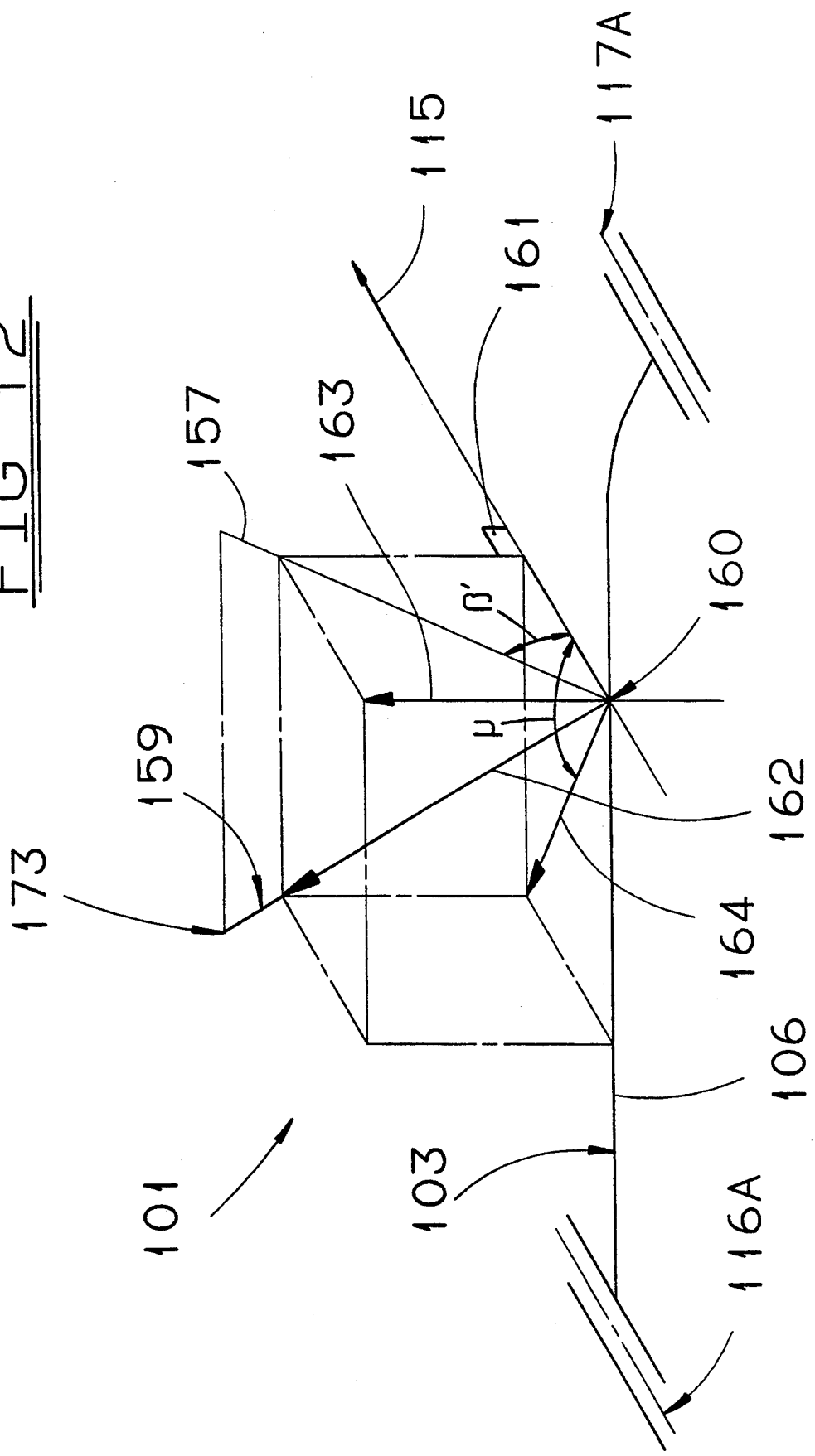
FIG. 12 diagrammatically represents the orientation of the retaining element.

As represented diagrammatically in FIG. 12, this retaining element (159) is placed so that during work, it has a sharp inclination upward and forward. Actually, orthogonal projection (157) of retaining element (159) in a vertical plane (161) directed in direction of work (115), forms, with the horizontal, an angle (β') of about 45°. In top view, retaining element (159) also extends forward and toward geometric axis (116A) of first pivot connection (116) while forming, in relation to direction of work (115), an angle (μ) of about 60°. At its other longitudinal end, retaining element (159) is connected to hitching structure (105) in the vicinity of the longitudinal end of upper beam (111), directed toward harvesting mechanism (104).

As described in the previous example of the embodiment, harvesting mechanism (104) rests on the ground with a certain force. On advancing, this force produces a resistance to the advance which, due to the invention, is advantageously used to lighten inside end (124) of harvesting mechanism (104).

Actually, this resistance to the advance tends to cause support beam (106) to pivot backward around geometric axis (113A) of pivot pin (113). This creates a pulling force (162) in retaining element (159). Considering the sharp inclination of retaining element (159), this pulling force (162) produces a substantial vertical component (163) which tends to lift the outside end of support beam (106), i.e., inside end (124) of harvesting mechanism (104).

Furthermore, since connection (160) connecting retaining element (159) to support beam (106) is installed at least approximately at the same level as geometric axis (116A) of first hinge (116), horizontal component (164) of the pulling force (162) does not create any detrimental effect.

Due to retaining element (159) according to the invention, inside end (124) of harvesting mechanism (104) can thus be easily lightened. The load-lightening of the outside end of harvesting mechanism (104) is assured by load-lightening element (150) which creates a torque around geometric axis (117A), while participating in the load-lightening of inside end (124) of harvesting mechanism (104).

Moreover, since retaining element (159) is not subjected to any force when mower (101) is in its removal position, the hitching and the removal of the mower (101) are simplified. Actually, in the removal position, retaining element (159) allows the pivoting of hitching structure (105) in relation to support beam (106) around geometric axis (116A) of first hinge (116).

Furthermore, considering its slight bulk and its simplicity of operation, retaining element (159) is relatively easy to produce. Actually, as can be seen in FIGS. 10, 11, 13 and 14, retaining element (159) is a connecting rod (165) hinged, on the one hand, to support beam (106) by a first ball-and-socket connection (166) and, on the other hand, to hitching structure (105) by a second ball-and-socket connection (167).

Advantageously, the connecting rod (165) comprises a safety tie rod (168) allowing the backward pivoting of harvesting mechanism (104) when the latter encounters an obstacle. This safety tie rod (168), known to a person skilled in the art, is composed of two longitudinal parts (169, 170) mounted to slide in one another and a trigger device (171). Part (170) of the safety tie rod (168) further exhibits a bend (172). This bend (172) prevents safety tie rod (168) and positioning cylinder (114) from mutually interfering with one another when mower (101) is brought back to the median plane of tractor (102).

Moreover, the retaining element (159) can further be connected to hitching structure (105) at several points (173) each installed at a different height on the hitching structure (105), so as to make it possible for the user to modify the load-lightening force by simple changing of connecting point (173).

Finally, various modifications are possible, particularly with regard to the constitution of the various elements or by substitution of technical equivalents, without thereby going outside the scope of protection defined by the claims. Thus, in particular, in the examples of embodiments described, it would be perfectly possible to install the retaining element on the other side of the first hinge (11; 116).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A mower comprising:
   a cutting mechanism which extends, during work, crosswise to direction of work;
   a hitching structure for connection to a power-driven vehicle;
   a support beam connected at a first end to the hitching structure by a first hinge having a first forwardly directed geometric axis, and connected at a second end to the cutting mechanism with a second hinge having a second forwardly directed geometric axis, said first hinge being able to pivot in relation to the hitching structure around a third upwardly directed geometric axis; and
   a retaining element extending at least approximately in a vertical plane directed in the direction of work and placed between the support beam and the hitching structure for preventing, under normal work conditions, a pivoting of the support beam around said third geometric axis, a connection of said retaining element to the support beam extending during work at a height lower than that of the first geometric axis of the first hinge;
   wherein said retaining element is installed so that during work the retaining element has an upward and forward inclination with respect to the direction of work.

2. The mower according to claim 1, wherein the connection of the retaining element to the support beam extends between the first geometric axis of the first hinge and the second geometric axis of the second hinge.

3. The mower according to claim 2, wherein the connection of the retaining element to the support beam extends in an outside half of the support beam connected to the cutting mechanism.

4. The mower according to claim 3, wherein connection of the retaining element to the support beam is located at about two-thirds of a distance separating the first geometric axis of the first hinge and the second geometric axis of the second hinge.

5. The mower according to claim 1, wherein the connection of the retaining element to the support beam is installed on a front face of the support beam.

6. The mower according to claim 1, wherein an orthogonal projection of the retaining element in a vertical plane directed in the direction of work forms, with the horizontal, an angle $\beta$, $\beta'$ of between 20° and 70°.

7. The mower according to claim 6, wherein said angle $\beta$, $\beta'$ is about 45°.

8. The mower according to claim 1, wherein the retaining element is connected to a lower part of the hitching structure.

9. The mower according to claim 1, wherein the hitching structure has a triangular shape comprising two lower hitching points and one upper hitching point for connection to three hitching points of the power-driven vehicle, and the retaining element is connected to said hitching structure in the vicinity of a lower hitching point of said two lower hitching points opposite the cutting mechanism.

10. The mower according to claim 1, wherein the retaining element can be connected successively to the hitching structure at several connecting points each installed at a different height on said hitching structure, so as to be able to modify a load-lightening force by simple changing of said connecting point.

11. The mower according to claim 1, wherein the retaining element is a connecting rod hinged at a first end to the support beam by a first ball-and-socket connection and, at a second end to the hitching structure by a second ball-and-socket connection.

12. The mower according to claim 1, wherein the retaining element is in the form of a safety tie rod which allows a pivoting of the cutting mechanism backward, when the cutting mechanism encounters an obstacle.

13. The mower according to claim 1, wherein the third geometric axis and the first geometric axis of the first hinge are at least approximately concurrent.

14. The mower according to claim 1, wherein the second hinge extends in the vicinity of an inside end of the cutting mechanism.

15. The mower according to claim 1, wherein the cutting mechanism is lightened by a load-lightening element.

16. The mower according to claim 14, wherein:
the cutting mechanism is lightened by a load-lightening element; and
the load-lightening element extends between the cutting mechanism and the hitching structure.

17. The mower according to claim 1, further comprising an operating element that extends between the hitching structure and the cutting mechanism for bringing the cutting mechanism into a raised position for transport.

18. The mower according to claim 1, wherein during removal, the cutting mechanism extends longitudinally on the ground and the support beam rests on the ground by a brace.

19. The mower according to claim 1, further comprising a device for processing the product cut by the cutting mechanism.

20. A mower comprising:
a cutting mechanism which extends, during work, crosswise to a direction of work;
a hitching structure for connection to a power-drive vehicle;
a support beam connected at a first end to the hitching structure by a first hinge having a first forwardly directed geometric axis, and connected at a second end to the cutting mechanism with a second hinge having a second forwardly directed geometric axis, said first hinge being able to pivot in relation to the hitching structure around a third upwardly directed geometric axis; and
a retaining element placed between the support beam and the hitching structure for preventing, under normal work conditions, a pivoting of the support beam around said third geometric axis, a connection of said retaining element to the support beam extending during work at least approximately at the same height or above the first geometric axis of the first hinge;
wherein said retaining element is installed so that during work it has an upward and forward inclination with respect to said direction of work.

21. The mower according to claim 20, wherein the connection of the retaining element to the support beam extends between the first geometric axis of the first hinge and the second geometric axis of the second hinge.

22. The mower according to claim 21, wherein the connection of the retaining element to the support beam extends in an outside half of the support beam connected to the cutting mechanism.

23. The mower according to claim 22, wherein the connection of the retaining element to the support beam is located at about two-thirds of a distance separating the first geometric axis of the first hinge from the second geometric axis of the second hinge.

24. The mower according to claim 20, wherein the connection of the retaining element to the support beam is installed on a front face of the support beam.

25. The mower according to claim 20, wherein an orthogonal projection of the retaining element in a vertical plane directed in the direction of work, forms, with the horizontal, an angle $\beta$, $\beta'$ of between 20° and 70°.

26. The mower according to claim 25, wherein said angle $\beta$, $\beta'$ is about 45°.

27. The mower according to claim 20, wherein in top view, the retaining element extends forward and toward the first geometric axis of the first hinge.

28. The mower according to claim 27, wherein the retaining element forms, in top view, in relation to the direction of work an angle $\mu$ of about 60°.

29. The mower according to claim 20, wherein the retaining element is connected to an upper part of the hitching structure.

30. The mower according to claim 20, wherein the hitching structure comprises a gantry comprising an upper beam, and the retaining element is connected to said gantry in the vicinity of a longitudinal end of said upper beam directed toward the cutting mechanism.

31. The mower according to claim 20, wherein the hitching structure comprises three hitching points for connection to three hitching points of the power-driven vehicle.

32. The mower according to claim 20, wherein the retaining element can be connected successively to the hitching structure at several connecting points each installed at a different height on said hitching structure, so as to be able to modify a load-lightening force by simple changing of said connecting point.

33. The mower according to claim 20, wherein the retaining element is a connecting rod hinged at a first end to the support beam by a first ball-and-socket connection and, at a second end to the hitching structure by a second ball-and-socket connection.

34. The mower according to claim 20, wherein the retaining element is in the form of a safety tie rod which allows a pivoting of the cutting mechanism backward, when the cutting mechanism encounters an obstacle.

35. The mower according to claim 31, wherein, as seen in a direction of advance during work, the first geometric axis of the first hinge extends at least approximately in a center of a triangle defined by the three hitching points of the hitching structure.

36. The mower according to claim 20, wherein the third geometric axis and the first geometric axis of the first hinge are at least approximately concurrent.

37. The mower according to claim 20, wherein the second hinge extends in the vicinity of an inside end of the cutting mechanism.

38. The mower according to claim 20, wherein the cutting mechanism is lightened by a load-lightening element.

39. The mower according to claim 38, wherein:
the second hinge extends in the vicinity of an inside end of the cutting mechanism; and
the load-lightening element extends between the cutting mechanism and the hitching structure.

40. The mower according to claim 20, further comprising an operating element that extends between the hitching structure and the cutting mechanism for bringing the cutting mechanism into a raised position for transport.

41. The mower according to claim 20, wherein during removal, the cutting mechanism extends longitudinally on the ground and the support beam rests on the ground by a brace.

42. The mower according to claim 20, further comprising a device for processing the product cut by the cutting mechanism.

* * * * *